United States Patent
Asahara

(10) Patent No.: US 11,218,707 B2
(45) Date of Patent: Jan. 4, 2022

(54) MOVING IMAGE DISTRIBUTION DEVICE, METHOD, AND PROGRAM AND MOVING IMAGE DISTRIBUTION SYSTEM

(71) Applicants: Cyberstep, Inc., Tokyo (JP); Shinnosuke Asahara, Kanagawa (JP)

(72) Inventor: Shinnosuke Asahara, Kanagawa (JP)

(73) Assignees: Cyberstep, Inc., Tokyo (JP); Shinnosuke Asahara, Kanagawa (JP)

( * ) Notice: Subject to any disclaimer, the term of this patent is extended or adjusted under 35 U.S.C. 154(b) by 0 days.

(21) Appl. No.: 16/639,480

(22) PCT Filed: Aug. 8, 2018

(86) PCT No.: PCT/JP2018/029721
§ 371 (c)(1),
(2) Date: Feb. 14, 2020

(87) PCT Pub. No.: WO2019/044435
PCT Pub. Date: Mar. 7, 2019

(65) Prior Publication Data
US 2021/0250591 A1    Aug. 12, 2021

(30) Foreign Application Priority Data
Aug. 31, 2017   (JP) .............................. JP2017-166379

(51) Int. Cl.
*H04N 19/162*    (2014.01)
*H04N 19/159*    (2014.01)
(Continued)

(52) U.S. Cl.
CPC .............. *H04N 19/162* (2014.11); *A63F 9/30* (2013.01); *H04L 65/607* (2013.01); *H04N 19/159* (2014.11); *H04N 19/164* (2014.11)

(58) Field of Classification Search
CPC .. H04N 19/162; H04N 19/159; H04N 19/164; A63F 9/30; H04L 65/607
See application file for complete search history.

(56) References Cited

U.S. PATENT DOCUMENTS

2008/0198929 A1*   8/2008   Fujihara ............... H04N 19/107
                                              375/240.13
2008/0263616 A1   10/2008   Sallinen et al.

FOREIGN PATENT DOCUMENTS

CN       1998240 A       7/2007
JP       H0651968        2/1994
(Continued)

OTHER PUBLICATIONS

"International Application No. PCT/JP2018/029721, International Search Report and Written Opinion dated Sep. 11, 2018", (Sep. 11, 2018), 7 pgs.

(Continued)

*Primary Examiner* — Maria E Vazquez Colon
(74) *Attorney, Agent, or Firm* — Schwegman Lundberg & Woessner, P.A.

(57) ABSTRACT

By allowing video to be reproduced without causing any image loss or delay, the present invention provides a video streaming apparatus and video streaming system that allow a user to accurately control a mechanism of a machine while watching video taken of the machine. A video streaming apparatus according to the present invention includes an encoding section configured to perform interframe coding of video taken by an imaging section and generate an encoded video stream; and a reference frame generation management section configured to receive a stop signal of reference frame generation or a resume signal of reference frame generation from a receiving terminal of the encoded video stream, in which when the reference frame generation management section receives the stop signal of reference frame genera- (Continued)

tion, the encoding section stops reference frame generation, and when the reference frame generation management section receives the resume signal of reference frame generation, the encoding section resumes reference frame generation and performs interframe coding.

7 Claims, 8 Drawing Sheets

(51) Int. Cl.
*H04N 19/164* (2014.01)
*A63F 9/30* (2006.01)
*H04L 29/06* (2006.01)

(56) References Cited

FOREIGN PATENT DOCUMENTS

| JP | H11355782 A | 12/1999 |
|----|-------------|---------|
| JP | 2004140691 A | 5/2004 |
| JP | 2019033444 A | 2/2019 |
| JP | 6630323 B2 | 12/2019 |
| WO | WO-2019044435 A1 | 3/2019 |

OTHER PUBLICATIONS

"Japanese Application No. 2017-166379, Decision to Grant a Patent dated Nov. 15, 2019", (Nov. 15, 2019), 5 pgs.

"Chinese Application No. 201880055164.0, First Office Action dated Sep. 3, 2020", (Sep. 3, 2020), 13 pgs.

"International Application No. PCT/JP2018/029721, English Translation of International Preliminary Report on Patentability dated Mar. 3, 2020", (Mar. 3, 2020), 5 pgs.

"International Application No. PCT/JP2018/029721, English Translation of Written Opinion of the International Searching Authority dated Sep. 11, 2018", (Sep. 11, 2018), 4 pgs.

\* cited by examiner

MOVING IMAGE DISTRIBUTION DEVICE, METHOD, AND PROGRAM AND MOVING IMAGE DISTRIBUTION SYSTEM

PRIORITY CLAIM TO RELATED APPLICATIONS

This application is a U.S. national stage filing under 35 U.S.C. § 371 from International Application No. PCT/JP2018/029721, filed on 8 Aug. 2018, and published as WO2019/044435 on 7 Mar. 2019, which claims the benefit under 35 U.S.C. 119 to Japanese Application No. 2017-166379, filed on 31 Aug. 2017, the benefit of priority of each of which is claimed herein, and which applications and publication are hereby incorporated herein by reference in their entirety.

TECHNICAL FIELD

The present invention relates to a video streaming apparatus and video streaming system that allow video to be reproduced on a receiving terminal in real time without delay even if the video is streamed via a network with low quality.

BACKGROUND ART

With the development of Internet networks and increases in the processing speed of computers, video streaming with large data amounts that was difficult before has become possible, allowing anyone to perform video streaming in real time.

Conventionally, a game machine has been known in which prizes in a cabinet are picked up using a crane. With this game machine, a user is supposed to win prizes by moving the crane from side to side and back and forth and such machines are often installed in amusement arcades and the like. In recent years, however, there have been services to send motion video and audio in the cabinet of a game machine in real time via a network, allowing a user to transmit an operation signal for a mechanism while reproducing the motion video and audio on a user terminal such as a portable terminal, smartphone, or personal computer and thereby control a mechanism of the game machine. Such a service is disclosed, for example, in patent literature 1.

Also, available techniques are not limited to such game machines and there is a technique for taking pictures using a surveillance camera or the like and transmitting an operation signal for a necessary operation remotely from a user terminal or the like.

CITATION LIST

Patent Literature

Patent Literature 1: Japanese Patent Laid-open No. 2014-4192

SUMMARY OF INVENTION

Technical Problem

However, for example, to win prizes, it is necessary to drive the mechanism of the game machine accurately, but, for that, high-quality video has to be streamed to the user terminal in real time. However, depending on the data size of streamed data, transmission speed of the network to the user terminal and processing speed of the user terminal may make it impossible to reproduce the video smoothly on the user terminal without delay or error.

Therefore, some video streaming providers encode motion video and thereby compress the data size of the video to be streamed such that the video can be reproduced smoothly on any terminal in any communications environments. However, for example, even if frame images of the video is compressed and encoded by a video coding method such as MPEG (Moving Picture Experts Group) or H.264/AVC (Advanced Video Coding) and a generated video stream is stored in IP (Internet Protocol) packets, transmitted to the Internet, and received on a user terminal, if the Internet environment is congested, errors such as a packet data delay or loss can occur, which may make it impossible to reproduce the video properly on the user terminal in real time.

When video compression and encoding is performed, although the data amount as a whole has been reduced compared to the data amount of video data before the encoding, the data amount of an I (Intra) frame, which is a reference frame, is larger than other P (Predictive) frame or B (Bi-predictive prediction) frame data amount, which are differential frames, and errors tend to occur during reception of the I frame.

When a mechanism is operated remotely via video streaming, it becomes important to process the video in real time. Therefore, it is not possible to reduce a processing burden on the terminal by averaging the data amount per unit time through buffering or the like.

To solve the above problems, the present invention provides a video streaming apparatus or video streaming system that allows a clear video stream to be reproduced reliably on a receiving terminal regardless of the communications environment and the processing capability of a user terminal.

Solution to Problem

In view of the above object, the present invention provides a video streaming apparatus comprising: an encoding section configured to perform interframe coding of video taken by an imaging section and generate an encoded video stream; and a reference frame generation management section configured to receive a stop signal of reference frame generation or a resume signal of reference frame generation from a receiving terminal configured to receive the encoded video stream, wherein when the reference frame generation management section receives the stop signal of reference frame generation, the encoding section stops reference frame generation, and when the reference frame generation management section receives the resume signal of reference frame generation, the encoding section resumes reference frame generation and performs interframe coding. Since the generation of the reference frame is controlled based on the reference frame generation signal or resume signal of reference frame generation received from the receiving terminal, the generation of the reference frame is inhibited at the convenience of the receiving terminal. This makes it possible to prevent delays and errors in video reproduction caused by receiving reference frames with a large data size.

In the video streaming apparatus according to the present invention, the stop signal of reference frame generation is a mechanism control signal and the resume signal of reference frame generation is a mechanism control stop signal; the video streaming apparatus further comprises a mechanism control section configured to control driving of a connected mechanism; and upon receiving the mechanism control signal, the mechanism control section drives the connected mechanism based on the mechanism control signal, and upon receiving the mechanism control stop signal, the mechanism control section stops driving the mechanism. Since generation of the reference frame is stopped when the mechanism control signal is received from the receiving terminal, while the user is controlling the driving of the mechanism, delays and errors in video reproduction can be prevented. This allows the user to control the mechanism accurately while watching video.

The mechanism controlled by the mechanism control section is a crane used to pick up a prize in a game machine in which prizes in a play field are picked up; and the encoding section may encode video of an interior of the game machine, the video being taken by the imaging section.

The video streaming apparatus further comprises a video stream storage section configured to store an encoded video stream preceded by a reference frame generated most recently by the encoding section, wherein upon receiving a video streaming request from another receiving terminal, the reference frame generation management section first transmits the encoded video stream preceded by the reference frame stored in the video stream storage section. Since the encoded video stream preceded by the reference frame is stored in the video stream storage section, even if a video streaming request to the same machine is received from another receiving terminal while a differential frame is being generated, the video can be reproduced smoothly on the other receiving terminal.

The present invention provides a video streaming method comprising: an encoding step of performing interframe coding of video taken by an imaging section and generating an encoded video stream; and a resume signal of reference frame generation receiving step of receiving a stop signal of reference frame generation or a resume signal of reference frame generation from a receiving terminal configured to receive the encoded video stream, wherein when the stop signal of reference frame generation is received, the encoding step stops reference frame generation, and when the resume signal of reference frame generation is received, the encoding step resumes reference frame generation and performs interframe coding.

The present invention provides a computer program comprising: an encoding section configured to perform interframe coding of video taken by an imaging section and generate an encoded video stream; and a reference frame generation management section configured to receive a stop signal of reference frame generation or a resume signal of reference frame generation from a receiving terminal configured to receive the encoded video stream, wherein when the reference frame generation management section receives the stop signal of reference frame generation, the encoding section stops reference frame generation, and when the reference frame generation management section receives the resume signal of reference frame generation, the encoding section resumes reference frame generation and performs interframe coding.

The present invention provides a video streaming system comprising: a video streaming apparatus; and a receiving terminal, wherein the video streaming apparatus includes an encoding section configured to perform interframe coding of video taken by an imaging section and generate an encoded video stream, and a reference frame generation management section configured to receive a stop signal of reference frame generation or a resume signal of reference frame generation from the receiving terminal configured to receive the encoded video stream, in which when the reference frame generation management section receives the stop signal of reference frame generation, the encoding section stops reference frame generation, and when the reference frame generation management section receives the resume signal of reference frame generation, the encoding section resumes reference frame generation and performs interframe coding, and the receiving terminal includes a decoding section configured to receive the encoded video stream from the video streaming apparatus and decode and reproduce the encoded video stream.

In the video streaming system according to the present invention, the video streaming apparatus further includes a video stream storage section configured to store an encoded video stream preceded by a reference frame generated most recently by the encoding section; upon receiving a video streaming request from another receiving terminal, the reference frame generation management section first transmits the encoded video stream preceded by the reference frame stored in the video stream storage section; and upon receiving the encoded video stream preceded by the reference frame, the decoding section of the receiving terminal decodes the entire received video stream and generates and reproduces a frame image.

Advantageous Effects of Invention

According to the present invention, since generation of a reference frame is stopped when the stop signal of reference frame generation is received from the receiving terminal and the generation of the reference frame is resumed when a resume reference frame signal is received, it is possible to ensure that the receiving terminal will not receive a reference frame having a large data amount with unexpected timing and thereby to prevent image losses and delays.

Also, since the stop signal of reference frame generation received from the receiving terminal is a mechanism control signal intended to operate the mechanism of the machine shown in the video streamed by the video streaming apparatus, the reference frame generation is stopped while the mechanism of the machine is controlled by the receiving terminal. Therefore, while controlling the mechanism of the machine from the receiving terminal, because only differential frames with small data amounts are generated, no image loss or delay occurs and the user can control the mechanism accurately from the receiving terminal while watching video. Also, while the mechanism is being controlled, even though the mechanism is moving, there is no significant change in the motion video, and thus even if only differential frames are being generated, images can be provided to the receiving terminal without hindrance to display.

Furthermore, even if another receiving terminal requests streaming of the video while reference frame generation is stopped, generated frames preceded by the latest reference frame are transmitted by being retrieved from the video stream storage section and the video is reproduced on the receiving terminal after all the frames are combined. Consequently, even if there is a transmission request from another receiving terminal when no reference frame can be generated, video can be reproduced smoothly.

BRIEF DESCRIPTION OF DRAWINGS

FIG. 6 FIGS. 6(a) and 6(b) are diagrams describing workings of the coding process performed when the video streaming apparatus 10 receives a stop signal of reference frame generation or a resume signal of reference frame generation.

DESCRIPTION OF EMBODIMENTS

Figure 1:
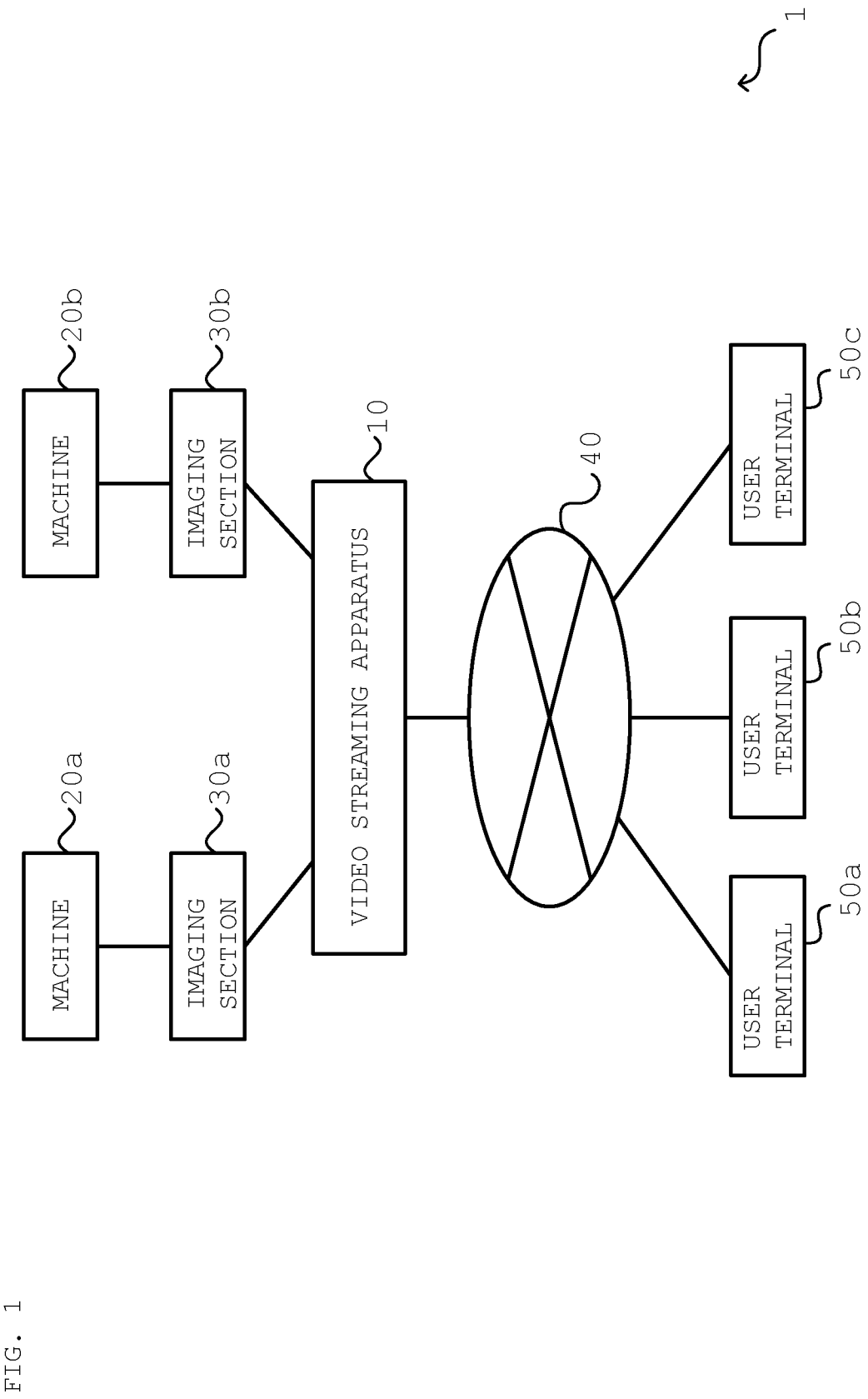
FIG. 1 is an example of an overall view of a video streaming system according to the present invention.

An embodiment of the present invention will be described below with reference to the drawings. FIG. 1 is an example of an overall view of a video streaming system according to the present invention. A video streaming system 1 is configured by being connected with machines 20 (20a and 20b) and imaging sections 30 (30a and 30b) and further with user terminals 50 (50a to 50c) via the Internet 40.

The video streaming apparatus 10 streams motion video shot by the imaging sections 30 installed for the respective machines 20 to the user terminals 50. The video streaming apparatus 10 receives the motion video produced by the imaging sections by imaging the machines 20, performs interframe coding, thereby generates encoded video streams, and transmits the encoded video streams to the user terminals 50. The user terminals 50 decode and reproduce the received video streams, allowing the users to learn conditions of the machines 20 in real time and transmit mechanism control signals for driving the mechanisms of the machines 20 while watching the reproduced video streams. Also, the video streaming apparatus 10 may have not only the function to stream video, but also a mechanism control and management function to control the connected machines 20. Specifically, the mechanism control signals received from the user terminals 50 are transmitted to mechanism driving sections of the machines 20 to control the mechanisms of the machines 20. Besides, user management and the like may be performed between the machines 20 and user terminals 50. The video streaming apparatus 10 performs interframe coding of the video taken by the imaging sections 30 and generate encoded video streams. The video streams are generated using a motion video coding technique such as MPEG or H.264/AVC.

The video streaming apparatus 10 receives a stop signal of reference frame generation or a resume signal of reference frame generation from any of the user terminals 50. Upon receiving the stop signal of reference frame generation, the video streaming apparatus 10 stops generating reference frames, i.e., I frames, and generates only differential frames, e.g., P frames or B frames. Then, upon receiving the resume signal of reference frame generation, reference frame generation is resumed. The stop signal of reference frame generation may be, for example, a mechanism control signal instructing mechanism control to be started and the resume signal of reference frame generation may be, for example, a mechanism control stop signal instructing mechanism control to be stopped.

The machines 20 are shot by the imaging sections 30 and can be mechanically controlled remotely by signals from the user terminals 50. Examples of the machines 20 include game machines, toy cars, drones, and personal computers. The user terminals 50 receive and display the video being shot by the imaging sections 30 and transmit signals for controlling the mechanisms of the machines 20. The machines 20 are controlled based on the mechanism control signals received from the user terminals.

The imaging sections 30 (30a and 30b), which are designed to image the machines 20, specifically, are video cameras. The imaging sections 30 take motion video needed by the user terminals 50 for mechanism control over the machines 20 and supply the motion video to the video streaming apparatus 10 in order for the video streaming apparatus 10 to generate video streams to be distributed to the user terminals 50. The imaging sections 30 are shown as having a one-to-one relationship with the machines 20 but this is not restrictive and the imaging sections 30 may have a many-to-one relationship with the machines 20. The user terminals 50 can send mechanism control signals while checking states of the machines using the motion video taken by the imaging sections 30.

The Internet 40 is a network that connects the machines 20 with the user terminal 50 desiring to remotely control the machines 20.

Each of the user terminal 50 is a computer connected to the Internet 40 and is a receiving terminal configured to receive motion video from the video streaming apparatus 10. By displaying a controller provided, for example, as Web content on a display section of the user terminal 50 while checking the movement of the machine 20 using the received motion video, the user enters inputs, thereby transmits a mechanism control signal or a mechanism control stop signal to the video streaming apparatus 10, and thereby controls the mechanisms of the machine 20. The user terminal 50 decodes, reproduces, and displays the video stream received from the video streaming apparatus 10. Also, if plural frame images including a reference frame and differential frame are received before the current distributed frame image from the video streaming apparatus 10 at the start of reception of video, all the plural frame images are decoded before the current distributed frame image is generated and reproduced.

Figure 2:
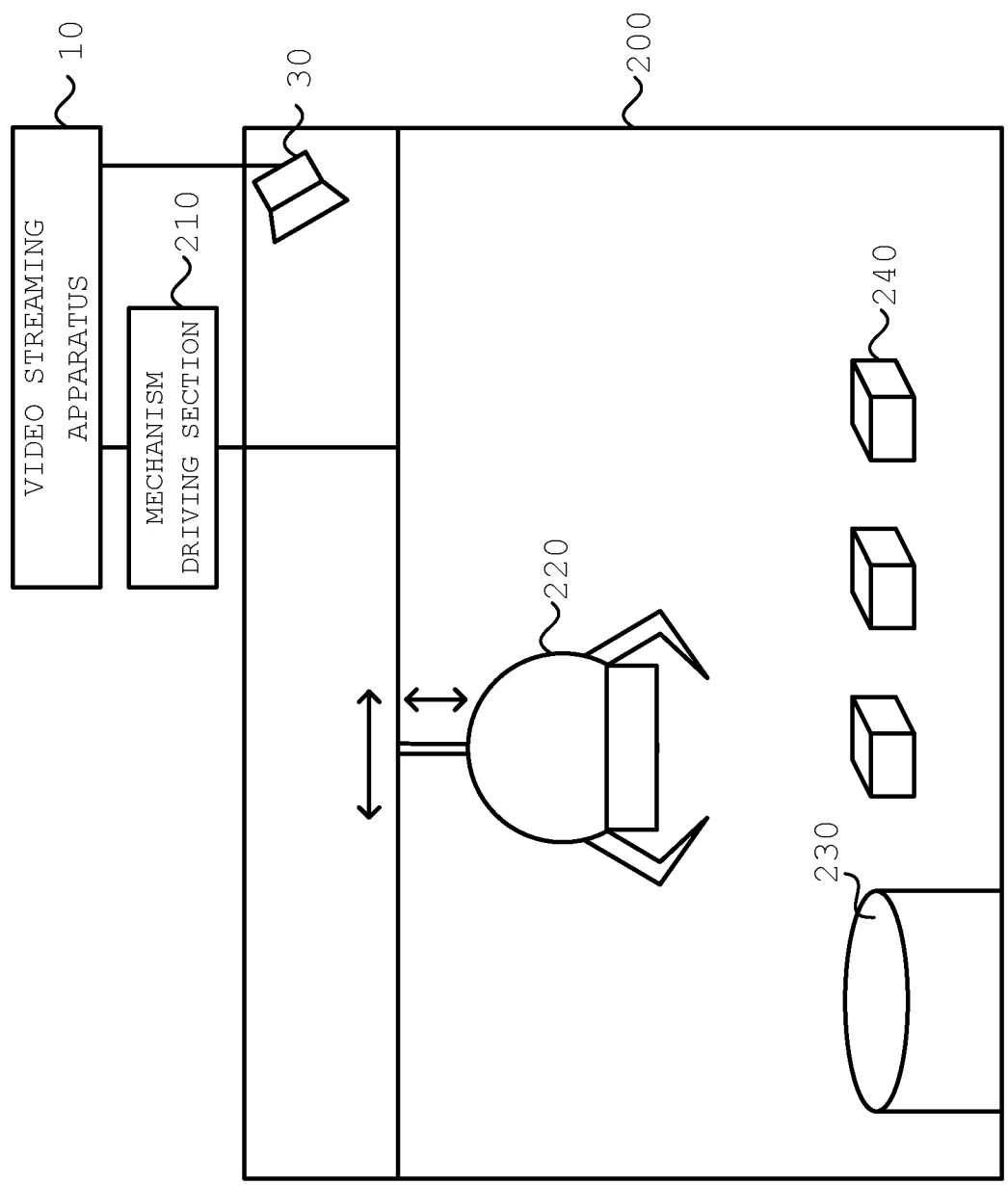
FIG. 2 is a diagram showing an example of a system configuration when a machine 20 is a game machine 200, where the system configuration is made up of the game machine 200 and a video streaming apparatus 10.

FIG. 2 is a diagram showing an example of a system configuration when the machine 20 is a game machine 200, where the system configuration is made up of the game machine 200 and the video streaming apparatus 10.

The video streaming apparatus 10 is the same as the video streaming apparatus 10 of FIG. 1 and is used to stream motion video to the user terminal 50, where the motion video is shot by the imaging sections 30 installed to image an interior of a cabinet of the game machine 200. The video streaming apparatus 10 distributes a video stream to the user terminal 50 and receives a stop signal of reference frame generation or a resume signal of reference frame generation. When the stop signal of reference frame generation is received, the video streaming apparatus 10 stops generating reference frames, and generates a video stream by generating only differential frames. On the other hand, when the resume signal of reference frame generation is received, the video streaming apparatus 10 resumes generating reference frames, performs a normal coding process, and generates a video stream. When the stop signal of reference frame generation is a mechanism control signal, the video streaming apparatus 10 stops reference frame generation and moves a crane 220 according to the mechanism control signal received by a mechanism driving section 210. When the resume signal of reference frame generation is also a mechanism control stop signal, the video streaming apparatus 10 sends a signal for stopping the moving crane 220 to the mechanism driving section 210 and thereby stops the crane 220. Note that a detailed configuration of the video streaming apparatus 10 will be described later.

The game machine 200 includes the mechanism driving section 210, the crane 220, a prize outlet 230, and prizes 240. The game machine 200 provides a claw crane game in which the user is supposed to pick up a target in a play field in the cabinet of the machine and the crane 220 is designed to be operated by control signals transmitted from the user terminal 50 connected via the Internet 40. A play involves moving the crane in the game machine and opening and closing, or pulling up, a claw of the crane 220 in an attempt to pick up a target, and ends when the attempt succeeds or fails. A controller for use to operate the crane 220 of the game machine 200 is provided to the user terminal 50 as Web content, and the crane and other mechanisms operate when a mechanism control command is received from the user terminal 50 and stop operation when a mechanism control stop signal is received.

The mechanism driving section 210, which is designed to move the crane 220, is, for example, a motor. The mechanism driving section 210 moves the crane 220 according to a mechanism control signal or mechanism control stop signal received via the video streaming apparatus 10.

Also, in addition to the mechanism control signal received from the user terminal 50, after mechanism control is performed by the user terminal 50, the mechanism driving section 210 follows control signals generated by the video streaming apparatus 10 in driving the operation of lowering the crane and closing the claw, the operation of lifting the crane, moving to the prize outlet 230, and opening the claw, and the operation of returning to a predetermined place.

The crane 220, which is driven by the mechanism driving section 210, moves back and forth (x direction) and right and left (y direction) in response to the mechanism control signal or mechanism control stop signal received from the user terminal 50 and descends and ascends (z direction) when its position is determined. During descent, by closing two halves of the claw of the crane 220, the user tries to pick up a prize in the cabinet of the game machine. When the claw is closed, the crane 220 ascends, moves to the prize outlet 230, and opens the claw. Then, the crane 220 returns to a predetermined place. The claw operates to grip and pick up a prize by opening and closing.

The prize outlet 230 is a port through which the prize picked up by the crane 220 is thrown out and the prize is ejected out of the cabinet of the game machine 200 through the prize outlet 230. For example, a sensor is installed at the prize outlet 230 such that any prize ejection can be detected. The ejected prize is delivered to the user who uses the user terminal 50.

The prizes 240 are placed in the play field inside the game machine 200 and picked up by operating the crane 220. One or more prizes 240 are placed and the user tries to pick up the prize 240 by operating the crane 220 by transmitting a mechanism control signal or a mechanism control stop signal from the user terminal 50.

The imaging section 30, which is the same as the imaging sections 30 of FIG. 1, is a video camera. The imaging section 30, which images the interior of the game machine 200, shoots such that a positional relationship between the crane 220 and prizes 240 can be checked from the user terminal 50. Whereas one imaging section is illustrated here, plural imaging sections may be installed such that the positional relationship can be checked from multiple angles. The video taken by the imaging section 300 is transmitted to the video streaming apparatus 10, which performs interframe coding and transmits an encoded video stream to the user terminal 50.

Figure 3:
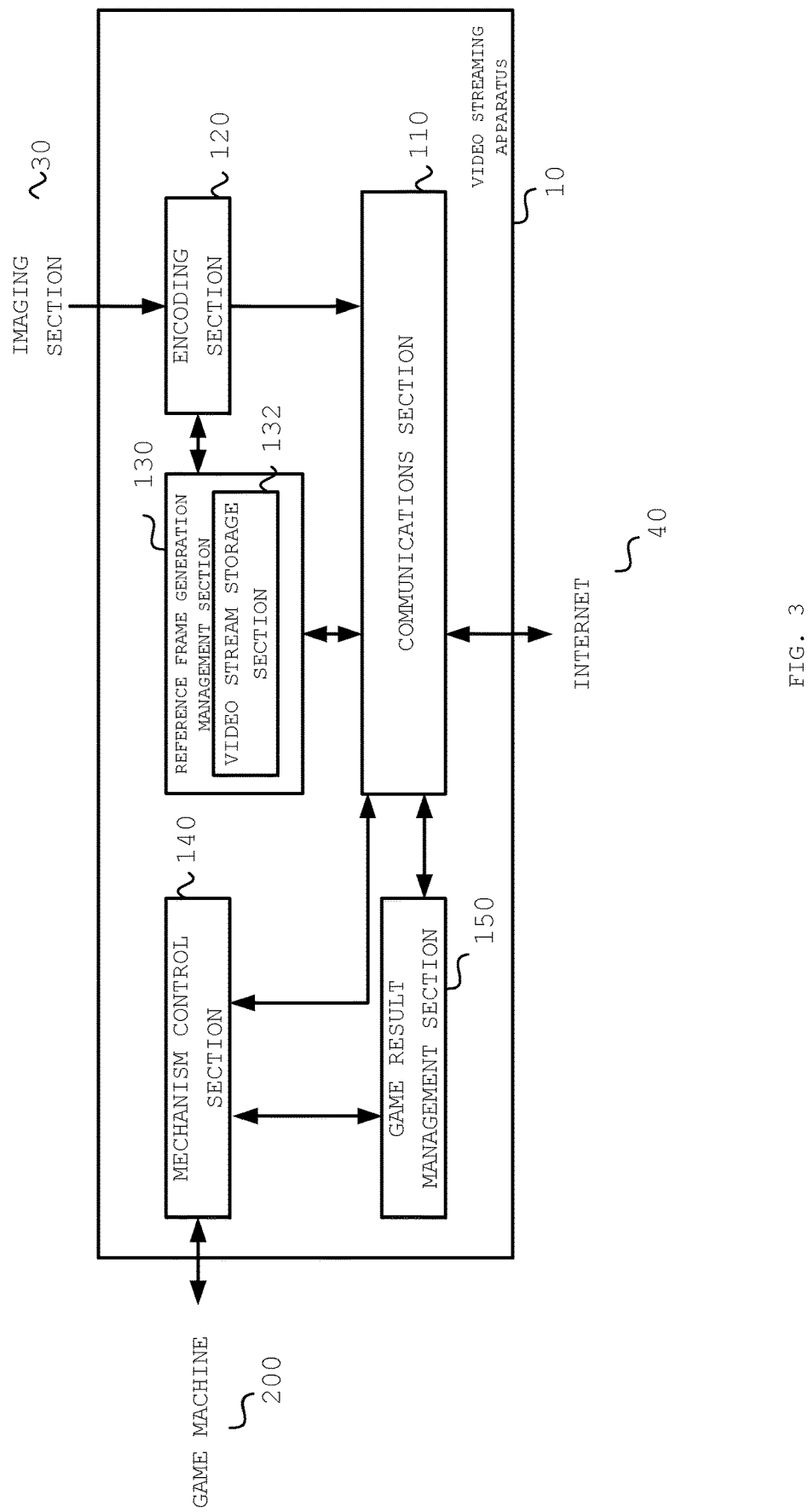
FIG. 3 is a functional block diagram showing a configuration example of the video streaming apparatus 10.

FIG. 3 is a functional block diagram showing a configuration example of the video streaming apparatus 10. A communications section 110 stores the video stream generated by the video streaming apparatus 10 in IP packets and transmits the IP packets to the user terminal 50 via the Internet 40 and receives a stop signal of reference frame generation or a resume signal of reference frame generation, and a mechanism control signal or mechanism control stop signal from the user terminal 50. The received signals are supplied to the reference frame generation management section 130 and a mechanism control section 140. Also, a video stream generated by an encoding section 120 is distributed to the user terminal 50 via the communications section 110.

The encoding section 120, which is a so-called video encoder, performs interframe coding of the video taken by the imaging section 30 and generates an encoded video stream. The encoded video stream is packetized by the communications section 110 and transmitted to the user terminal 50 via the Internet 40. The encoding section 120 generates a reference frame or differential frame using interframe coding.

The reference frame generation management section 130 manages generation of the reference frames, i.e., I frames, of the encoding section 120. Also, the reference frame generation management section 130 manages the stop signal of reference frame generation or resume signal of reference frame generation received by the communications section 110 from the user terminal 50. Upon receiving the stop signal of reference frame generation, the reference frame generation management section 130 gives a signal to the encoding section 120, instructing the encoding section 120 to set a frame type for use in encoding video in a differential frame. Also, upon receiving the resume signal of reference frame generation, the reference frame generation management section 130 gives a signal to the encoding section 120, instructing the encoding section 120 to resume reference frame generation and set a frame type for use in encoding video in any frame. The reference frame generation management section 130 controls the encoding section 120 such that after the resume signal of reference frame generation is received, the encoding section 120 will return to the normal coding process, return to the process of generating a reference frame as a first frame of a GOP (Group of Pictures), and generate a reference frame or differential frame. When supplied with a video stream generated by the encoding section 120, the reference frame generation management section 130 performs control such that frame images preceded by the most recent reference frame will be stored in a video stream storage section 132.

Also, the video stream storage section 132 of the reference frame generation management section 130 stores reference frames and differential frames preceded by the latest reference frame generated by the encoding section 120. If a new video streaming request is received from another user terminal 50 during video streaming, the reference frame generation management section 130 reads frames preceded by the latest reference frame out of the video stream storage section 132 and transmits the frames to the requesting user terminal.

The mechanism control section 140, which is connected with the machine 20, such as the mechanism driving section 210 of the game machine 200, connected to the video streaming apparatus 10, controls the mechanism driving section 210 based on the mechanism control signal received from the user terminal 50 and performs control such that the crane 220 will move from side to side and back and forth as desired by the user.

Also, even when no mechanism control signal is received from the user terminal 50 the mechanism control section 140 controls up-and-down motions, claw opening and closing motions, movements to the prize outlet 230, movements to a predetermined initial position, and other motions/movements of the crane 220.

A game result management section 150 manages information about the user's plays on the game machine 200. For example, the game result management section 150 manages user information and per-play billing information as well as information about play results, information as to whether any prize has been won, delivery information if any prize has been won, and other information. When game start information on the game machine 200 is received from the user terminal 50, the game result management section 150 levies a charge and waits until a mechanism control signal is received. When a reception of a mechanism control signal and mechanism control stop signal is detected, the game result management section 150 waits for information from the sensor installed at the prize outlet 230 to see whether a prize is detected as a game result at the prize outlet 230. When the user has won a prize and the prize is ejected through the prize outlet 230, the game result management section 150 notifies the user terminal 50 about the winning of the prize via the communications section 110 and asks the user to enter prize delivery information or the like.

Figure 4:
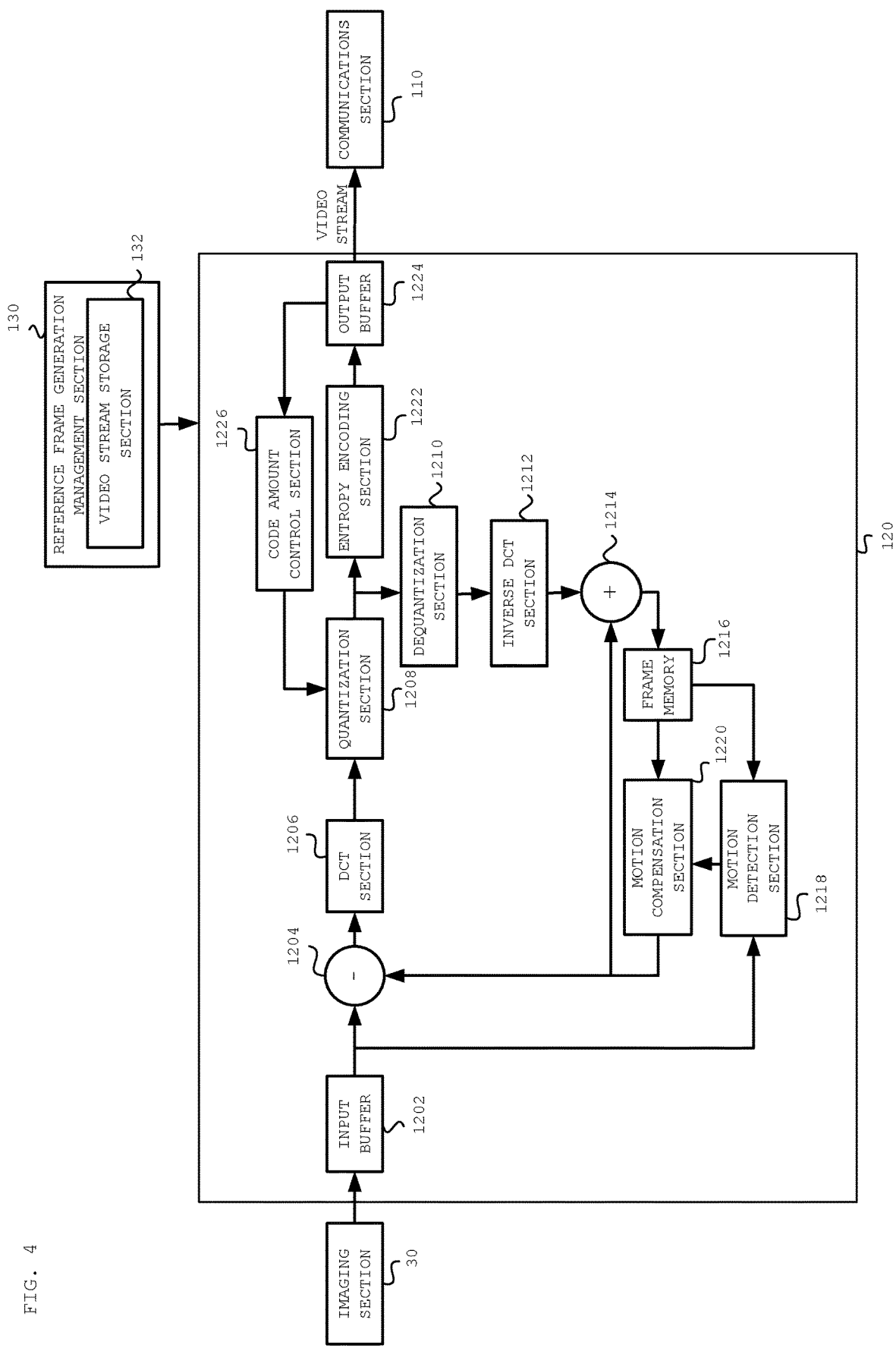
FIG. 4 is a block diagram showing a configuration example of an encoding section 120.

FIG. 4 is a block diagram showing a configuration example of the encoding section 120. The encoding section 120 receives video from the imaging section 30, encodes frame images according to, for example, the H.264/AVC standard, and thereby generates an encoded video stream. Also, in response to a frame generation signal from the reference frame generation management section 130, the encoding section 120 generates a reference frame or differential frame. When a signal for setting a differential frame is received, the encoding section 120 generates only P or B frames, and when a signal for setting any frame from the reference frame generation management section 130 is received, the encoding section 120 generates I, P, or B frames. The encoding section 120 includes an input buffer 1202, a subtractor 1204, a DCT section 1206, a quantization section 1208, a dequantization section 1210, an inverse DCT section 1212, an adder 1214, a frame memory 1216, a motion detection section 1218, a motion compensation section 1220, an entropy encoding section 1222, an output buffer 1224, and a code amount control section 1226.

The input buffer 1202 rearranges and holds frame images that are needed and referred to in performing interframe coding of the video input from the imaging section 30. The input buffer 1202 holds, for example, reference frames necessary for forward prediction, backward prediction, and bidirectional prediction and supplies reference images to the motion detection section 1218.

In generating an I frame, the subtractor 1204 supplies an image frame from the input buffer 1202 as it is to the DCT section 1206, and in generating a P or B frame, the subtractor 1204 calculates a difference from a prediction image supplied from the motion compensation section 1220 and supplies the difference to the DCT section 1206.

The DCT section 1206 performs a discrete cosine transform (DCT) process on the supplied I, P, or B frames, and supplies the resulting DCT coefficient to the quantization section 1208.

The quantization section 1208 quantizes the DCT coefficient and supplies the quantized DCT coefficient to the entropy encoding section 1222. Also, the quantization section 1208 supplies the DCT coefficient quantized for use in motion compensation to the dequantization section 1210.

The dequantization section 1210 dequantizes the quantized DCT coefficient supplied, and supplies the dequantized DCT coefficient to the inverse DCT section 1212. The inverse DCT section 1212 performs an inverse DCT process on the dequantized data. Consequently, an encoded image frame is restored. The frame memory 1216 stores the restored frame image for use as a reference image for motion compensation. By referring to the frame images stored in the frame memory 1216, the motion detection section 1218 searches the frame image currently being processed for any motion and thereby detects any motion. Using the reference image, the motion compensation section 1220 generates a motion vector and a prediction image compensated for motion and supplies the prediction image to the subtractor 1204. Also, the generated motion vector and prediction image are stored in the frame memory 1216 via the adder 1214. Also, the motion vector is supplied to the entropy encoding section 222.

The entropy encoding section 1222 performs entropy encoding (variable-length encoding) of the DCT coefficient quantized by the quantization section 1208 and stores compressed image data subjected to entropy encoding in the output buffer 1224. In the case of P or B frames, i.e., differential frames, the entropy encoding section 1222 performs entropy encoding of the quantized DCT coefficient of differential images together with the motion vectors supplied from the motion detection section 1218.

After an encoded video stream is stored and header information and the like are added, the output buffer 1224 outputs the encoded video stream as a video stream. The output video stream is distributed to the user terminal 50 via the communications section 110 as well as supplied to and stored in the video stream storage section 132.

Based on storage quantity of the output buffer 1224, the code amount control section 1226 performs feedback control over a quantization process of the quantization section 1208.

Figure 5:
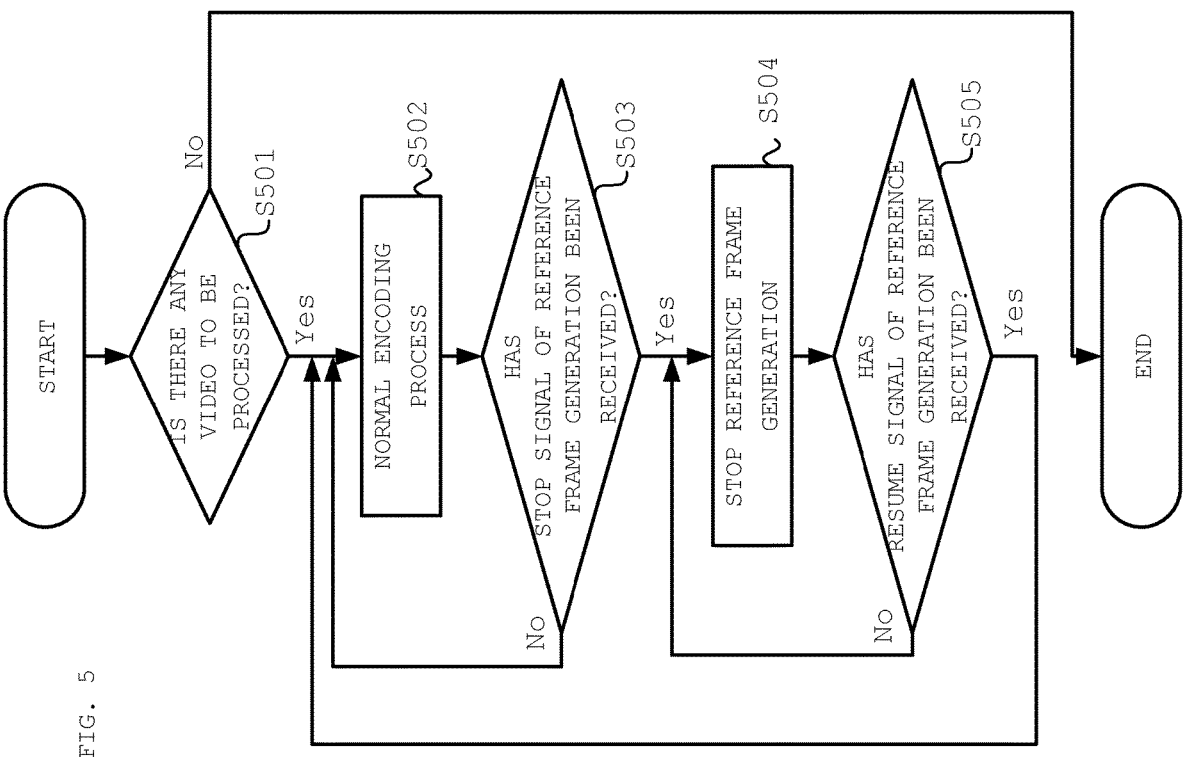
FIG. 5 is an exemplary flowchart of a coding process of a reference frame generation management section 130.

FIG. 5 is an exemplary flowchart of a coding process of the reference frame generation management section 130. The reference frame generation management section 130 determines whether there is any frame image to be processed by being input to the encoding section 120 from the imaging section 30 (step S501). If there is any frame image to be processed (Yes), the reference frame generation management section 130 sends a signal to the encoding section 120, instructing the encoding section 120 to perform a normal encoding process (step S502). For example, it is assumed that one GOP is made up of 60 frame images and is reproduced in 2 seconds. In this case, the normal encoding process always generates a reference frame at the beginning of each GOP, and subsequently generates 59 image frames, which are differential frames (P or B frames). If there is no frame image to be processed (No), the reference frame generation management section 130 finishes processing.

The reference frame generation management section 130 determines whether any stop signal of reference frame generation has been received from the communications section 110 (step S503). If a stop signal of reference frame generation has been received (Yes), the reference frame generation management section 130 sends a signal to the encoding section 120, instructing the encoding section 120 to stop reference frame generation. That is, a signal specifying P or B frames, which are differential frames, as frames to be generated is sent to the encoding section 120. Note that the stop signal of reference frame generation transmitted from the user terminal 50 may be a mechanism control signal. In that case, when the user starts a game, and trying to move the crane 220 of the game machine 200, enters and transmits a mechanism control signal from a Web controller displayed on the user terminal 50 the communications section 110 of the video streaming apparatus 10 receives the mechanism control signal and supplies the mechanism control signal to the mechanism control section 140 and reference frame generation management section 130. Upon receiving the mechanism control signal, the reference frame generation management section 130 transmits a signal to stop reference frame generation to the encoding section 120. If no stop signal of reference frame generation has been received (No), the reference frame generation management section 130 sends a signal to the encoding section 120, instructing the encoding section 120 to continue a normal encoding process (step S502).

After transmitting the stop signal of reference frame generation to the encoding section 120, the reference frame generation management section 130 determines whether any resume signal of reference frame generation has been received (step S505). If it is determined that a resume signal of reference frame generation has been received (Yes), the reference frame generation management section 130 sends a signal to the encoding section 120, instructing the encoding section 120 to continue a normal encoding process (step S502). If it is determined that no resume signal of reference frame generation has been received (No), the reference frame generation management section 130 sends a signal to the encoding section 120, instructing the encoding section 120 to continue the suspension of reference frame generation (step S504).

Figure 6:
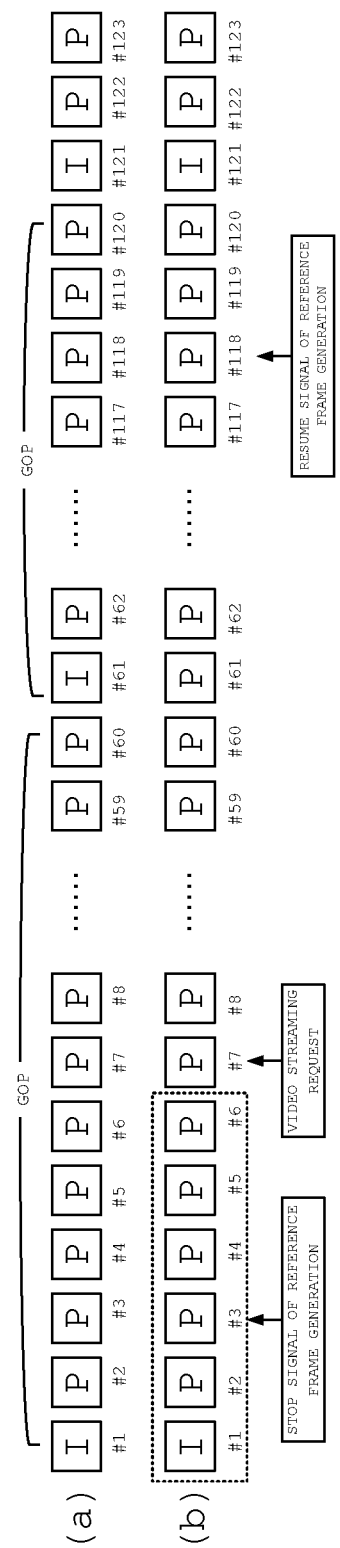

FIGS. 6(*a*) and 6(*b*) are diagrams describing workings of the coding process performed when the video streaming apparatus 10 receives a stop signal of reference frame generation or a resume signal of reference frame generation. FIG. 6(*a*) is a diagram showing a coding process performed when stop signal of reference frame generation or resume signal of reference frame generation is not received. When no stop signal of reference frame generation or resume signal of reference frame generation is received, a reference frame, i.e., an I frame, is generated at the beginning of each GOP, and the remaining 59 frames are differential frames. Here, all the differential frames are P frames, but not only P frames, but also B frames may be generated as the differential frames. Since an I frame, is generated at the beginning of each GOP, I frames are generated for the 1st, 61st, and 121st frame images. P frames are generated for the other frames.

FIG. 6(*b*) is a diagram showing a coding process performed when a stop signal of reference frame generation, resume signal of reference frame generation, or video streaming request is received. Here, from the user terminal 50, the video streaming apparatus 10 receives a stop signal of reference frame generation during generation of the 3rd frame, and receives a resume signal of reference frame generation during generation of the 118th frame. Note that the signals may also serve as mechanism control signals.

When the communications section 110 of the video streaming apparatus 10 receives a stop signal of reference frame generation and supplies the signal to the reference frame generation management section 130, the reference frame generation management section 130 gives a signal to the encoding section 120, instructing the encoding section 120 to stop reference frame generation, i.e., to change the type of frame to be encoded to the differential frame. Consequently, the encoding section 120 stops reference frame generation until a resume signal of reference frame generation is received, and thus does not generate an I frame, which is a reference frame, as the 61st frame even though the 61st frame is the first frame of a GOP. Then, during generation of the 118th frame, when the communications section 110 of the video streaming apparatus 10 receives a resume signal of reference frame generation, the reference frame generation management section 130 gives a signal to the encoding section 120, instructing the encoding section 120 to set the type of frame to be generated to any frame. Therefore, the encoding section 120 returns to the normal coding process, and generates an I frame as the 121st frame, which is the first frame of a GOP. The resume signal of reference frame generation may also serve as a mechanism control stop signal. With this configuration, since generation of reference frames with a large data size is stopped while the user is controlling a mechanism of the game machine or the like from the user terminal 50 via a network, video streaming is not delayed whatever network and user terminal may be used and video is streamed smoothly, allowing the user to control the mechanism accurately while watching video. Also, during operation of the mechanism, only the background changes with the operation of the mechanism, and thus even if only differential frames are generated, there is no problem with the quality of generated images.

Suppose that when a user terminal is involved with mechanism control, another user terminal transmits a video streaming request for the mechanism. FIG. 6(*b*) shows an example in which a video streaming request is received from a user terminal different from the user terminal controlling a mechanism during generation of the 7th frame. In this case, a video stream beginning with the 7th frame is transmitted to the requesting user terminal and the reference frame generation management section 130 transmits the 1st to 6th frame images by reading the frame images out of the video stream storage section 132. Therefore, even if the first frame received by the other user terminal is a differential frame, because all the frames preceded by the reference frame to which the differential frame belongs are received together, when all these frames are decoded, the image of the 7th frame can be decoded and reproduced.

Figure 7:
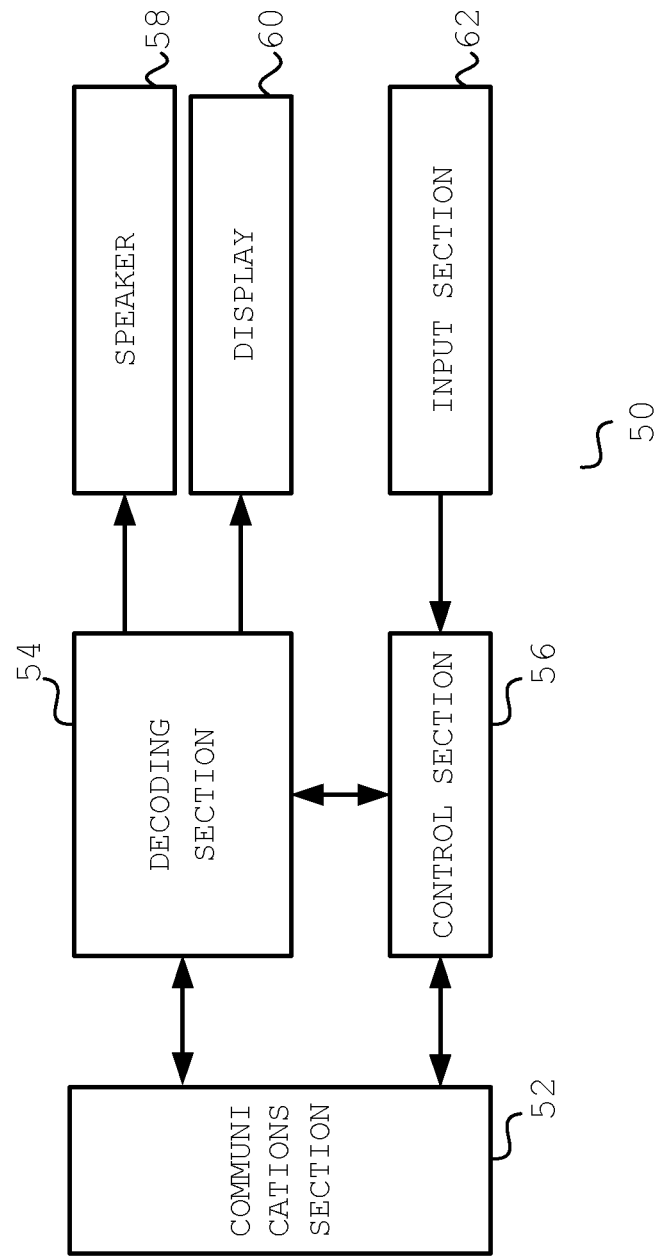
FIG. 7 is a functional block diagram showing a configuration example of a user terminal 50.

FIG. 7 is a functional block diagram showing a configuration example of the user terminal 50. The user terminal 50 may be any communications terminal such as a personal computer, smartphone, or cell phone that can connect to a network and display and reproduce video. The user terminal 50 includes a communications section 52, a decoding section 54, a control section 56, a speaker 58, a display 60, and an input section 62.

The communications section 52 receives video streams distributed from the video streaming apparatus 10 and showing states of machines such as game machines as well as an Internet page of a Web controller used to control mechanisms and transmits a stop signal of reference frame generation, a resume signal of reference frame generation, a mechanism control signal, a mechanism control stop signal, and other signals entered by the user to the video streaming apparatus 10.

The decoding section 54 decodes a video stream, encoded as received by the communications section 52, and reproduces the video. When audio is also contained, the decoding section 54 decodes the audio and outputs the audio and video to the speaker 58 and display 60, respectively.

The control section 56 performs overall control over the user terminal, including control over a decoding process of the decoding section 54, communications control over the communications section 52, and control in supplying mechanism control, stop mechanism control, and other signals entered from the input section 62 to the communications section 52.

The speaker 58 outputs the voice received by the video streaming apparatus 10 and decoded by the decoding section 54 while the display 60 outputs the video decoded by the decoding section 54. The input section 62, which accepts signals and the like for mechanism control from the user, includes, for example, a keyboard, a mouse, and/or a touch panel.

Figure 8:
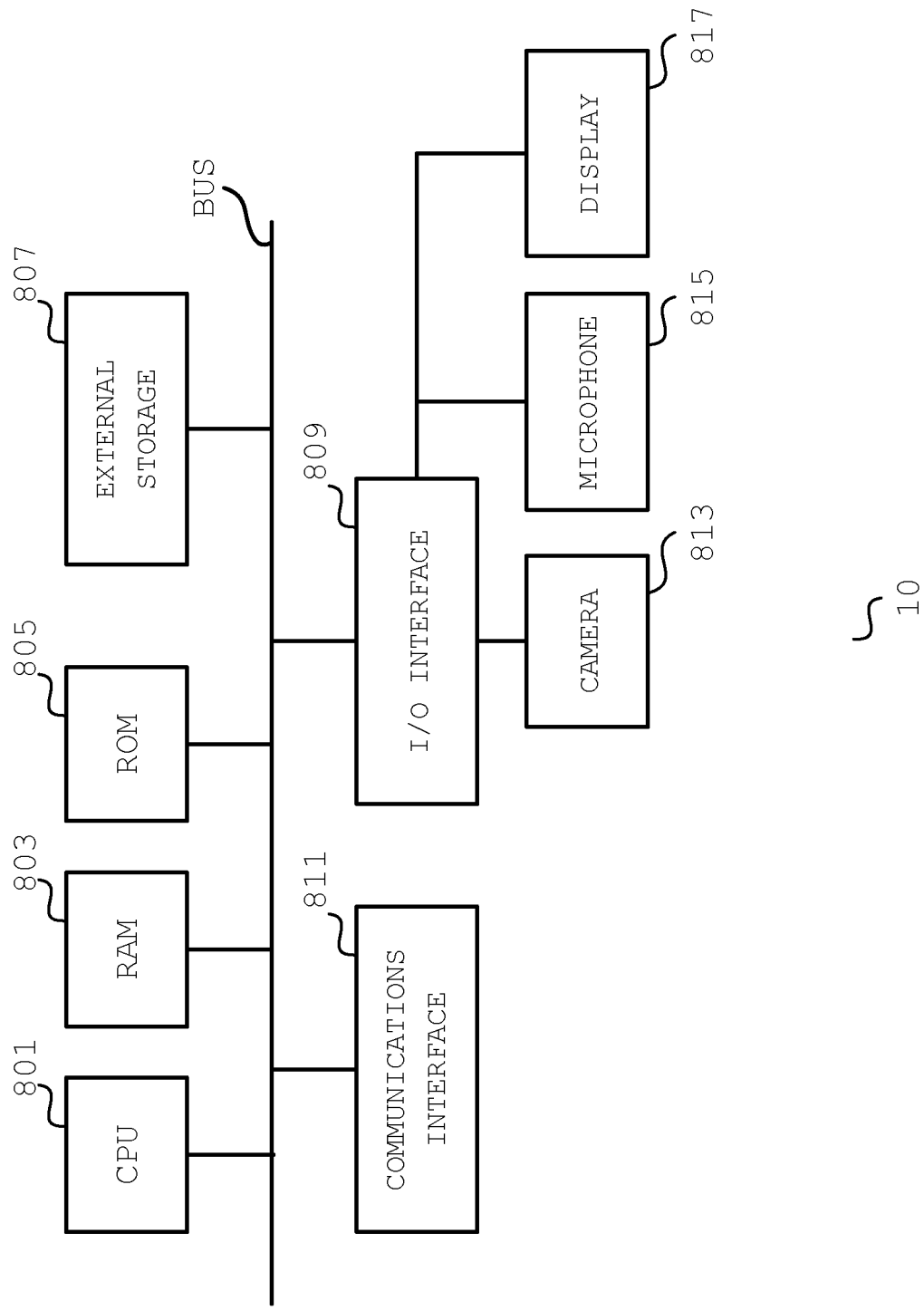
FIG. 8 is an example of a hardware configuration diagram of the video streaming apparatus 10.

FIG. 8 is an example of a hardware configuration diagram of the video streaming apparatus 10. As shown in FIG. 8, the video streaming apparatus 10 may be configured as programs running on a computer and a personal computer. The computer includes a CPU (central processing unit) 801; a RAM (Random Access Memory) 803, a ROM (Read Only Memory) 805, an external storage 807 such as a hard disk drive, an I/O interface 809, a communications interface 811 for use to connect to a communications network line, all of which are connected to the CPU 801 via a bus, where the communications interface 811 is connected with a camera 813, a microphone 815, and a display 817. In this case, for example, the functions of the encoding section 120, reference frame generation management section 130, mechanism control section 140, and game result management section 150 of the video streaming apparatus 10 are implemented by programs running on the computer; the function of the video stream storage section 132 is implemented by the external storage 807; and the function of the imaging section 30 is implemented by the camera. Also, if music and sounds of the game machine are streamed together with the video, the function of an audio input section is implemented by the microphone. The programs implementing these functions are stored in the external storage 807, loaded into the RAM 803, and then executed by the CPU 801.

REFERENCE SIGNS LIST

10 Video streaming apparatus
30 Imaging section
40 Internet
110 Communications section
120 Encoding section
130 Reference frame generation management section
132 Video stream storage section
140 Mechanism control section
150 Game result management section
200 Game machine

The invention claimed is:

1. A video streaming apparatus comprising:
an encoding section configured to perform interframe coding of video taken by an imaging section and generate an encoded video stream;
a reference frame generation management section configured to receive a stop signal of reference frame generation or a resume signal of reference frame generation from a receiving terminal configured to receive the encoded video stream, the stop signal of reference frame generation including a mechanism control stop signal and the resume signal of reference frame generation including a mechanism control signal; and
a mechanism control section configured to control driving of a connected mechanism;
wherein:
when the reference frame generation management section receives the stop signal of reference frame generation, the encoding section stops reference frame generation, and when the reference frame generation management section receives the resume signal of reference frame generation, the encoding section resumes reference frame generation and performs interframe coding; and
when receiving the mechanism control signal, the mechanism control section drives the connected mechanism based on the mechanism control signal, and when receiving the mechanism control stop signal, the mechanism control section stops driving the mechanism.

2. The video streaming apparatus according to claim 1, wherein:
the mechanism controlled by the mechanism control section is a crane used to pick up a prize in a game machine in which prizes in a play field are picked up; and
the encoding section encodes video of an interior of the game machine, the video being taken by the imaging section.

3. The video streaming apparatus according to claim 1, further comprising a video stream storage section configured to store an encoded video stream preceded by a reference frame generated most recently by the encoding section,
wherein upon receiving a video streaming request from another receiving terminal, the reference frame generation management section first transmits the encoded video stream preceded by the reference frame stored in the video stream storage section.

4. A video streaming method comprising:
an encoding step of performing interframe coding of video taken by an imaging section and generating an encoded video stream;
a resume signal of reference frame generation receiving step of receiving a stop signal of reference frame generation or a resume signal of reference frame generation from a receiving terminal configured to receive the encoded video stream, the stop signal of reference frame generation including a mechanism control stop signal and the resume signal of reference frame generation including a mechanism control signal; and
wherein:
when the stop signal of reference frame generation is received, the encoding step stops reference frame generation, and when the resume signal of reference frame generation is received, the encoding step resumes reference frame generation and performs interframe coding;
when the mechanism control signal is received at a mechanism control section configured to control driving of a connected mechanism, the mechanism control section drives the connected mechanism based on the mechanism control signal, and upon receiving the mechanism control stop signal at the mechanism control section, the mechanism control section stops driving the mechanism.

5. A non-transitory computer-readable medium, comprising a plurality of instructions that, responsive to being executed with processor circuitry of a computer-controlled video streaming apparatus, cause the computer-controlled video streaming apparatus to:

at an encoding section, perform interframe coding of video taken by an imaging section and generate an encoded video stream;

at a reference frame generation management section, receive a stop signal of reference frame generation or a resume signal of reference frame generation from a receiving terminal configured to receive the encoded video stream, the stop signal of reference frame generation including a mechanism control stop signal and the resume signal of reference frame generation including a mechanism control signal; and wherein:

when the reference frame generation management section receives the stop signal of reference frame generation, the encoding section stops reference frame generation, and when the reference frame generation management section receives the resume signal of reference frame generation, the encoding section resumes reference frame generation and performs interframe coding;

when the mechanism control signal is received at a mechanism control section configured to control driving of a connected mechanism, the mechanism control section drives the connected mechanism based on the mechanism control signal, and upon receiving the mechanism control stop signal at the mechanism control section, the mechanism control section stops driving the mechanism.

6. A video streaming system comprising:

a video streaming apparatus including a mechanism control section configured to control driving of a connected mechanism; and a receiving terminal, wherein:

the video streaming apparatus includes an encoding section configured to perform interframe coding of video taken by an imaging section and generate an encoded video stream, and a reference frame generation management section configured to receive a stop signal of reference frame generation or a resume signal of reference frame generation from the receiving terminal configured to receive the encoded video stream, the stop signal of reference frame generation including a mechanism control stop signal and the resume signal of reference frame generation including a mechanism control signal; and when the reference frame generation management section receives the stop signal of reference frame generation, the encoding section stops reference frame generation, and when the reference frame generation management section receives the resume signal of reference frame generation, the encoding section resumes reference frame generation and performs interframe coding the receiving terminal includes a decoding section configured to receive the encoded video stream from the video streaming apparatus and decode and reproduce the encoded video stream; and when receiving the mechanism control signal, the mechanism control section drives the connected mechanism based on the mechanism control signal, and when receiving the mechanism control stop signal, the mechanism control section stops driving the mechanism.

7. The video streaming system according to claim 6, wherein the video streaming apparatus further includes a video stream storage section configured to store an encoded video stream preceded by a reference frame generated most recently by the encoding section;

upon receiving a video streaming request from another receiving terminal, the reference frame generation management section first transmits the encoded video stream preceded by the reference frame stored in the video stream storage section; and upon receiving the encoded video stream preceded by the reference frame, the decoding section of the receiving terminal decodes the entire received video stream and generates and reproduces a frame image.

\* \* \* \* \*